United States Patent
Mishra et al.

(10) Patent No.: US 12,010,565 B2
(45) Date of Patent: *Jun. 11, 2024

(54) SYSTEMS AND METHODS FOR MANAGING MEC APPLICATION HOSTING

(71) Applicant: Cisco Technology, Inc., San Jose, CA (US)

(72) Inventors: Rakesh Mishra, San Ramon, CA (US); Amitesh Shukla, San Ramon, CA (US); Satish Kumar Mandavilly, Milpitas, CA (US); Manish Jhanji, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,940

(22) Filed: Jul. 13, 2022

(65) Prior Publication Data

US 2022/0353754 A1 Nov. 3, 2022

Related U.S. Application Data

(63) Continuation of application No. 16/749,624, filed on Jan. 22, 2020, now Pat. No. 11,395,195.

(51) Int. Cl.
*H04W 36/00* (2009.01)
*H04L 67/1012* (2022.01)
*H04L 67/1021* (2022.01)

(52) U.S. Cl.
CPC ..... *H04W 36/0033* (2013.01); *H04L 67/1012* (2013.01); *H04L 67/1021* (2013.01)

(58) Field of Classification Search
CPC ........... H04W 36/0033; H04L 67/1012; H04L 67/1021
See application file for complete search history.

(56) References Cited

U.S. PATENT DOCUMENTS

| 2016/0366244 A1 | 12/2016 | Chiu et al. |
| 2018/0183855 A1 | 6/2018 | Sabella et al. |

(Continued)

FOREIGN PATENT DOCUMENTS

| WO | 2017100640 A1 | 6/2017 |
| WO | 2019118964 A1 | 6/2019 |

(Continued)

OTHER PUBLICATIONS

Ceselli, A. et al., "Mobile Edge Cloud Network Design Optimization," IEEE/ACM Transactions on Networking, vol. 25, No. 3, Jun. 2017, pp. 1818-1831.

(Continued)

*Primary Examiner* — Jung H Park
(74) *Attorney, Agent, or Firm* — Baker Botts, LLP (57) ABSTRACT

In one embodiment, a method includes receiving, by a mobile edge computing (MEC) controller and from an application analytic engine, a registration request for an application. The registration request includes a request for MEC key performance indicators (KPIs). The method also includes communicating, by the MEC controller, MEC data associated with a first MEC host and a second MEC host to the application analytic engine. The method further includes receiving, by the MEC controller, MEC policies from the application analytic engine, determining to host the application in the first MEC host based on the MEC policies, and communicating the MEC policies to the first MEC host.

20 Claims, 4 Drawing Sheets

(56) References Cited

U.S. PATENT DOCUMENTS

| | | | |
|---|---|---|---|
| 2018/0376338 A1 | 12/2018 | Ashrafi | |
| 2019/0394655 A1* | 12/2019 | Rahman | ................ H04L 41/145 |
| 2020/0367141 A1* | 11/2020 | Cakulev | ................ H04M 15/66 |
| 2020/0382581 A1* | 12/2020 | Campbell | ............. H04L 67/101 |
| 2021/0028992 A1 | 1/2021 | Chang et al. | |
| 2021/0144057 A1* | 5/2021 | Giust | .................. H04L 41/5006 |

FOREIGN PATENT DOCUMENTS

| | | | |
|---|---|---|---|
| WO | 2019236083 A1 | 12/2019 | |
| WO | 2020013677 A1 | 1/2020 | |

OTHER PUBLICATIONS

Garcia-Saavedra, A. et al., Joint Optimization of Edge Computing Architectures and Radio Access Networks, IEEE Journal on Selected Areas in Communications, vol. 36, No. 11, Nov. 2018, pp. 2433-2443.

Patent Cooperation Treaty, International Search Report and Written Opinion, International Application No. PCT/US2021/012576, dated Apr. 15, 2021.

ETSI, "Support of 3GPP Measurements for Mobile Edge Computing," 3GPP TSG RAN WG3 #92, R3-161378, MEC (16)000206R1, Retrieved from the Internet: URL:http://www.3gpp.org/ftp/Meetings_3GPP_SYNC/RAN3/LSin/, May 23-27, 2016.

ETSI, "Multi-access Edge Computing (MEC); MEC Application Mobility Service," Drafat ETSI GS MEC 0021, V2 0.11. Retrieved from the Internet: URL:docbox.etsi.org, ISG/MEC/70-Draft/0021 AppMobility/MEC-0021 AppMobilityv2011/ MEC-0021 AppMobilityv2011-cl.docx, Oct. 17, 2019.

Kastanakis, S. et al., "Cabaret: Leveraging Recommendation Systems for Mobil Edge Caching," Jun. 7, 2018.

Liu, D., et al., "Caching at the Wireless Edge Design Aspects, Challenges and Fuure Directions," Oct. 31, 2018.

Office Action for European Application No. 21702819.0, dated Jan. 2, 2024, 8 Pages.

* cited by examiner

SYSTEMS AND METHODS FOR MANAGING MEC APPLICATION HOSTING

PRIORITY

This application is a continuation under 35 U.S.C. § 120 of U.S. patent application Ser. No. 16/749,624 filed Jan. 22, 2020, now U.S. Pat. No. 11,395,195, which is a utility filing entitled "*Systems and Methods for Managing MEC Application Hosting*," which is hereby incorporated by reference in its entirety.

TECHNICAL FIELD

This disclosure generally relates to application hosting, and more specifically to systems and methods for managing mobile edge computing (MEC) application hosting.

BACKGROUND

Resource management is an important area within the MEC infrastructure. Data usage, applications, content, and services are growing exponentially in the network. Due to the limitation of resources within the MEC infrastructure, simultaneous processing of all incoming data may be impossible.

DESCRIPTION OF EXAMPLE EMBODIMENTS

Overview

According to an embodiment, an MEC controller includes one or more processors and one or more computer-readable non-transitory storage media coupled to the one or more processors. The one or more computer-readable non-transitory storage media include instructions that, when executed by the one or more processors, cause the MEC controller to perform operations including receiving, from an application analytic engine, a registration request for an application. The registration request includes a request for MEC key performance indicators (KPIs). The operations also include communicating MEC data associated with a first MEC host and a second MEC host to the application analytic engine. The operations further include receiving MEC policies from the application analytic engine, determining to host the application in the first MEC host based on the MEC policies, and communicating the MEC policies to the first MEC host.

In some embodiments, the operations include generating a registration request result in response to authenticating and approving the registration request and communicating the registration request result to the application analytic engine. In certain embodiments, the operations include determining that a user equipment (UE) is streaming content from the application hosted in the first MEC host and determining that the UE is moving to a third MEC host. The third MEC host is located greater than a predetermined distance from the first MEC host. The operations further include copying the content to the application hosted in the third MEC host and redirecting the UE to stream the content from the application hosted in the third MEC host.

In certain embodiments, a physical component of the first MEC host and a physical component of the second MEC host are connected to each other via a wired connection, and the physical component of the first MEC host and the physical component of the second MEC host are located within a mile of each other. The MEC data may be collected by a first MEC data engine located within the first MEC host and by a second MEC data engine located within the second MEC host. The MEC data may be associated with one or more of the following: service usage patterns, UE capabilities, device mobility, and UE attachment period across the first and second MEC hosts.

In certain embodiments, the MEC data is associated with an MEC service provider, and the application analytic engine is associated with an application service provider. The MEC policies are generated by the application analytic engine using the MEC data associated with the MEC service provider and application data associated with the application service provider. The MEC policies may be associated with one or more of the following: MEC storage requirements, MEC compute requirements, a start time for hosting the application, and a stop time for hosting the application.

According to another embodiment, a method includes receiving, by an MEC controller and from an application analytic engine, a registration request for an application. The registration request includes a request for MEC KPIs. The method also includes communicating, by the MEC controller, MEC data associated with a first MEC host and a second MEC host to the application analytic engine. The method further includes receiving, by the MEC controller, MEC policies from the application analytic engine, determining to host the application in the first MEC host based on the MEC policies, and communicating the MEC policies to the first MEC host.

According to yet another embodiment, one or more computer-readable non-transitory storage media embody instructions that, when executed by a processor, cause the processor to perform operations including receiving, from an application analytic engine, a registration request for an application. The registration request includes a request for MEC KPIs. The operations also include communicating MEC data associated with a first MEC host and a second MEC host to the application analytic engine. The operations further include receiving MEC policies from the application analytic engine, determining to host the application in the first MEC host based on the MEC policies, and communicating the MEC policies to the first MEC host.

Technical advantages of certain embodiments of this disclosure may include one or more of the following. Embodiments of this disclosure provide application-driven resource optimization at the MEC. Certain systems and methods described herein optimize the storage and compute resources at the MECs based on the insights derived from an MEC service provider and an application data provider. The MEC service provider and the application data provider each have unique information about application usage patterns, mobility pattern, location, etc. The systems and methods described herein allow real-time participation of different entities to optimize the resources at the MEC. Embodiments of this disclosure reduce backhaul traffic and provide better user experience and lower latency for video/audio services.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
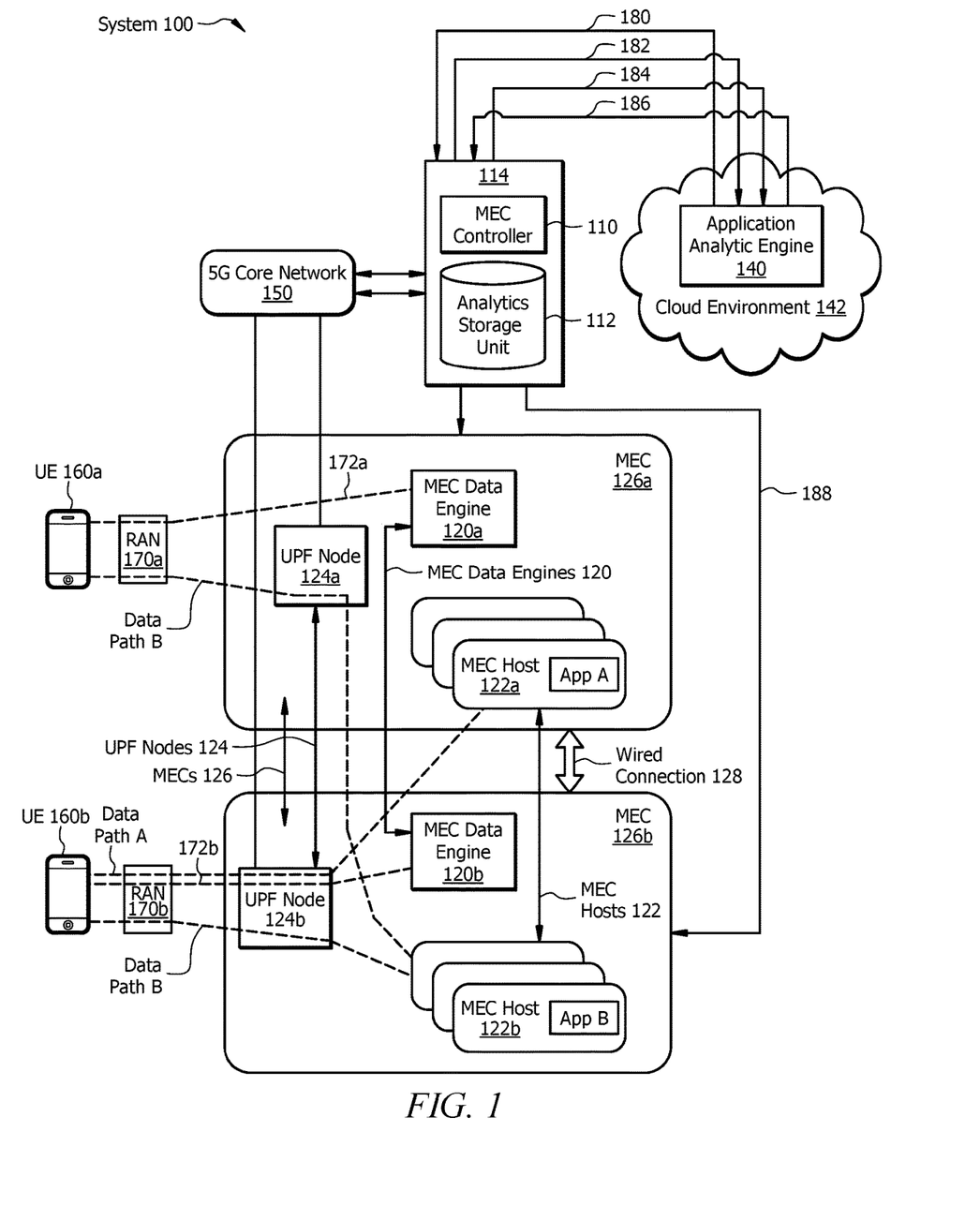
FIG. 1 illustrates an example system for managing MEC application hosting.
Figure 2:
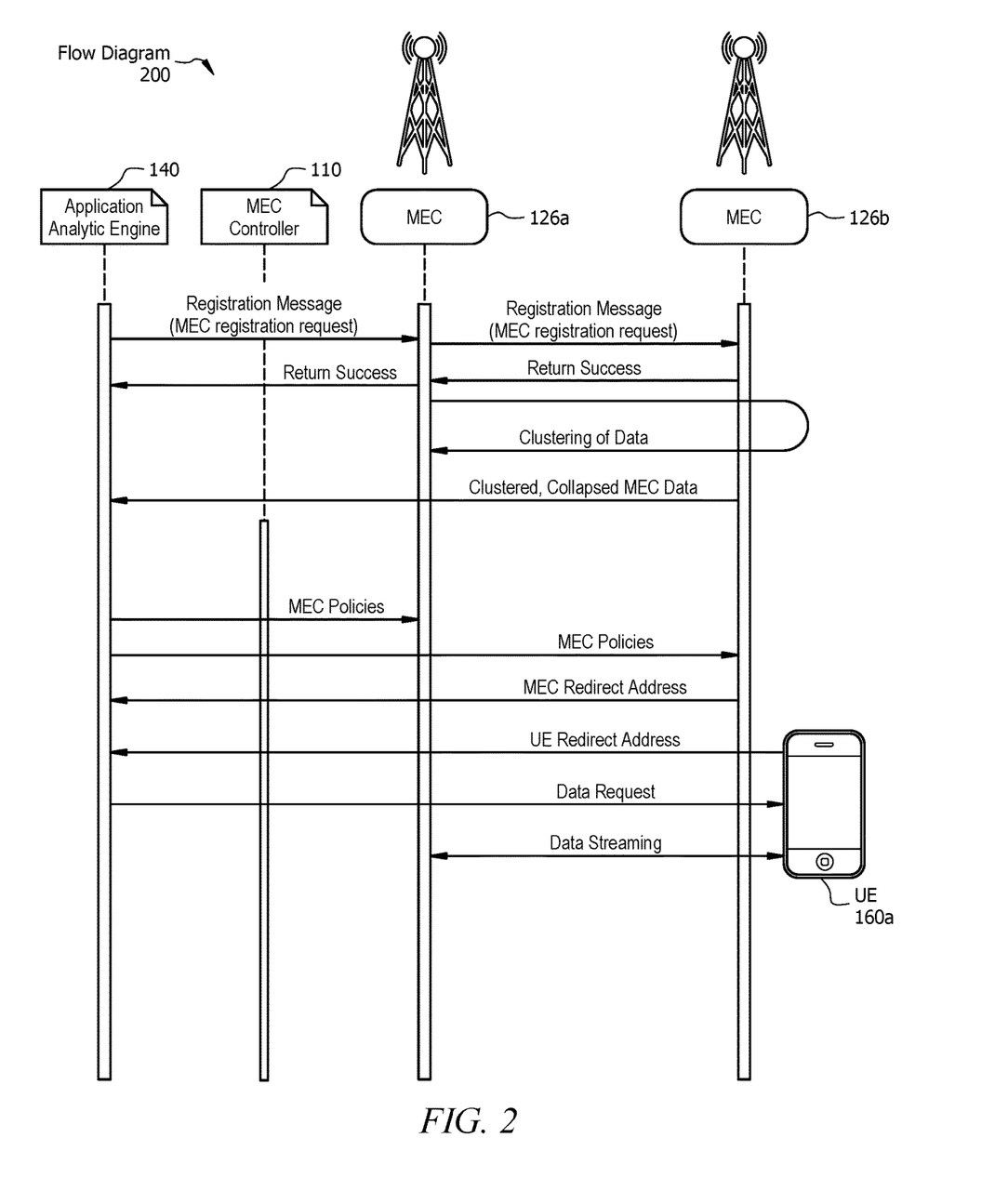
FIG. 2 illustrates an example flow diagram for managing MEC application hosting.
Figure 3:
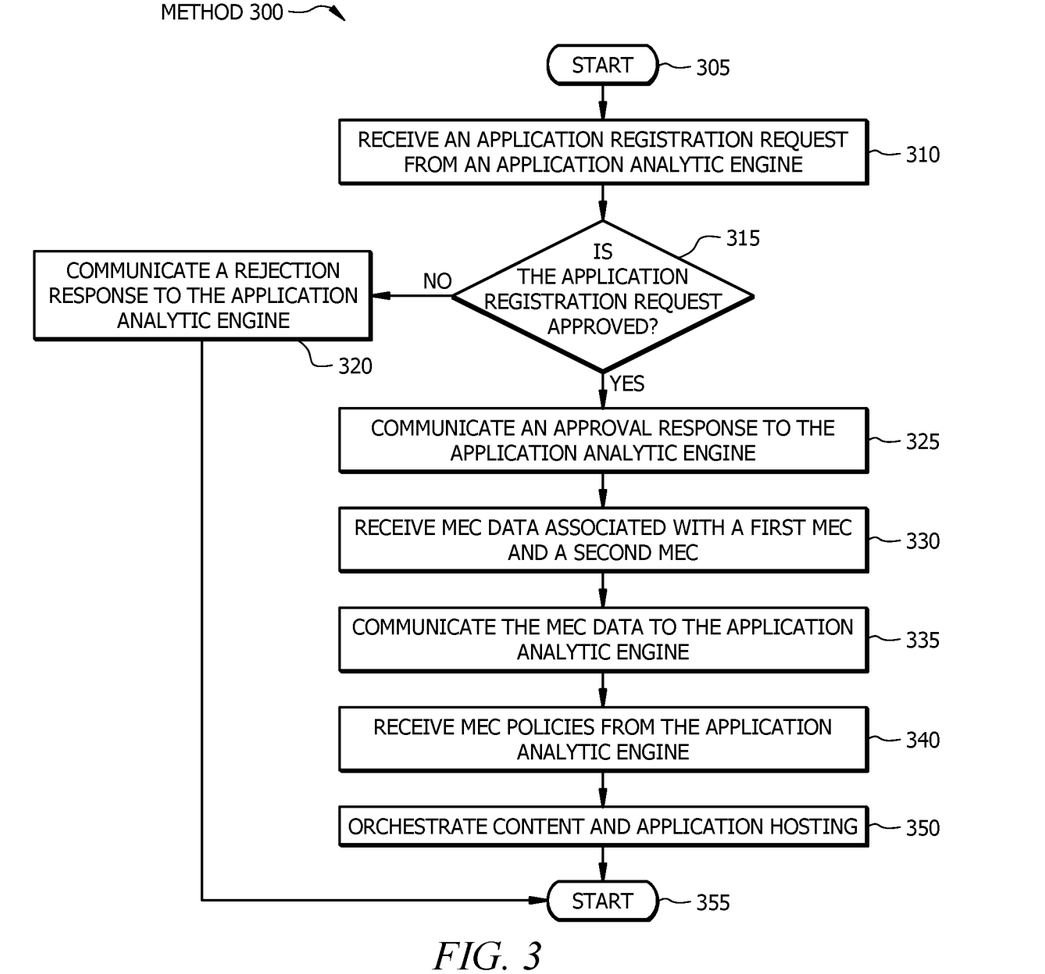
FIG. 3 illustrates an example method for managing MEC application hosting.
Figure 4:
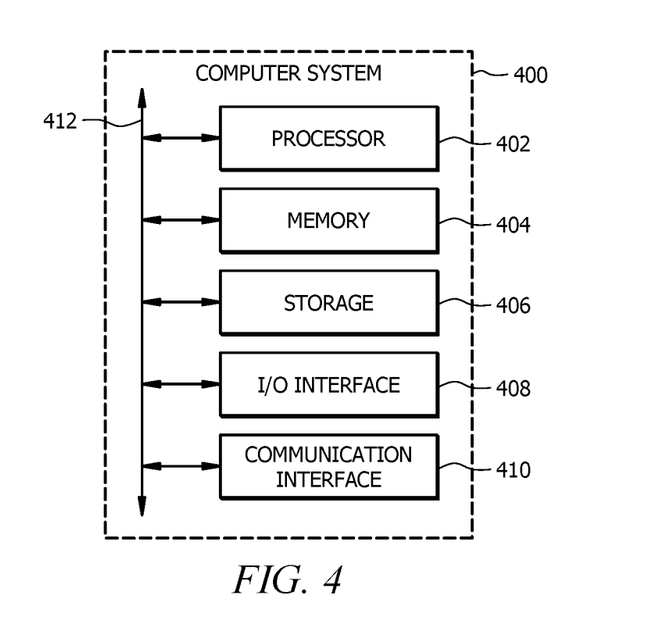
FIG. 4 illustrates an example computer system that may be used by the systems and methods described herein.

This disclosure describes systems and methods for efficiently using the available resources at the MEC by processing/serving the data on the MEC locally, which will reduce the traffic in the fifth generation wireless (5G) backhaul. Storage and compute resources on MECs are optimized based on insights derived from a service provider and an application data provider. Each entity has crucial information about application usage patterns, mobility pattern, location, etc. This disclosure allows for real-time participation of different entities to optimize the resources at the MEC. FIG. 1 shows an example system for managing MEC application hosting, and FIG. 2 shows an example flow diagram for managing MEC application hosting. FIG. 3 shows an example method for managing MEC application hosting. FIG. 4 shows an example computer system that may be used by the systems and methods described herein.

FIG. 1 illustrates an example system 100 for managing MEC application hosting. System 100 or portions thereof may be associated with an entity, which may include any entity, such as a business or company (e.g., a service provider) that manages MEC application hosting. The components of system 100 may include any suitable combination of hardware, firmware, and software. For example, the components of system 100 may use one or more elements of the computer system of FIG. 4.

System 100 includes an MEC controller 110 and an analytics storage unit 112 within an MEC management environment 114. System 100 also includes MEC data engines 120 (e.g., MEC data engine 120a and MEC data engine 120b), MEC hosts 122 (e.g., MEC host 122a and MEC host 122b), and UPF nodes 124 (e.g., UPF node 124a and UPF node 124b) within MECs 126 (e.g., MEC 126a and MEC 126b). System 100 further includes an application analytic engine 140 within a cloud environment 142, a 5G core network 150, UEs 160 (e.g., UE 160a and UE 160b), and radio access networks (RANs) 170 (e.g., RAN 170a and RAN 170b).

MEC controller 110 of system 100 represents any suitable computing component that may be used to process information for system 100. MEC controller 110 may coordinate one or more components of system 100 and/or facilitate communication between one or more components of system 100. MEC controller 110 may receive data from and/or transmit data to one or more components of system 100. MEC controller 110 may be located in any suitable location to process information for system 100. In the illustrated embodiment of FIG. 1, MEC controller 110 is located within an MEC management environment 114. MEC controller 110 may include one or more management controllers, one or more smart controllers, one or more orchestrator controllers, and the like.

MEC controller 110 provides application programming interfaces (APIs) to application service providers. For example, MEC controller 110 may expose APIs to application analytic engine 140. Application analytic engine 140 is associated with an application service provider. The application service provider may use the APIs to initiate registration with one or more MEC data engines 120. In certain embodiments, MEC controller 110 receives application registration requests from application analytic engine 140 via one or more APIs. The application registration requests may include requests for MEC key performance indicators (KPIs).

In some embodiments, MEC controller 110 determines whether to authenticate and/or approve the application registration requests. MEC controller 110 generates registration request results and communicates the registration request results to application analytic engine 140. For example, MEC controller 110 may generate a registration request result that accepts the application registration request. The registration request result may include an indication of acceptance, an identification of MEC 126 (e.g., MEC 126a or MEC 126b) that will host the associated application, and an identification of RAN 170 (e.g., RAN 170a or RAN 170b) associated with MEC 126. As another example, MEC controller 110 may generate a registration request result that rejects the application registration request. The registration request result may include an indication of rejection, a cause for the rejection, and offer details of the nearest MEC 126. The offer details of the nearest MEC may include offer details for MECs 126 associated with MEC service providers other than the MEC service provider of MEC 126a and MEC 126b.

MEC controller 110 communicates the application registration requests received from application analytic engine 140 to MEC 120a. In certain embodiments, MEC 120a may push the application registration requests to MEC 120b. MEC controller 110 receives MEC data from MEC 120a in response to communicating the application registration requests to MEC 120a. MEC controller 110 communicates the MEC data to application analytic engine 140 using the APIs. MEC controller 110 may communicate the MEC data to application analytic engine 140 in intervals requested by application analytic engine 140.

In some embodiments, in response to communicating MEC data to application analytic engine 140, MEC controller 110 receives MEC policies from application analytic engine 140. The MEC policies may be associated with one or more of the following: an identification (e.g., a name) of the application, MEC storage requirements, MEC compute requirements, an active time period for hosting the application, a start time for hosting the application, a stop time for hosting the application, a number of instances (e.g., a number of MECs 126) requirement, disk space requirements, and the like. MEC controller 110 may use the MEC policies to determine where to host the application. For example, MEC controller 110 may determine to host the application in MEC 126a based on the MEC policies.

MEC controller 110 may orchestrate content and application hosting across MECs 126. For example, MEC controller 110 may move an application to MEC 126a at a predetermined time and remove the application from MEC 126a at a later predetermined time in accordance with the MEC policies (e.g., the start time and stop time for hosting the application). As another example, MEC controller 110 may move application content to MEC 126a at a predetermined time and remove the application content from MEC 126a at a later predetermined time in accordance with the MEC policies. As still another example, MEC controller 110 may move an application/application content/application services from MEC 126a to MEC 126b at a predetermined time in accordance with the MEC policies (e.g., MEC storage requirements).

MEC controller 110 may synchronize and migrate content across MECs 126. For example, MEC controller 110 may determine that UE 160a is streaming content from an application hosted in MEC 126a. MEC controller 110 may determine that UE 160a is moving to MEC 126c (not shown) located greater than a predetermined distance (e.g., 30 miles) from MEC 126a. In response to this determination, MEC controller 110 may copy the content to the application hosted in MEC 126c. MEC controller 110 may redirect UE 160a to stream the content from the application hosted in MEC 126c.

Analytics storage unit 112 of system 100 stores information for MEC controller 110. The information may include data used by MEC controller 110 to perform one or more actions, data generated by MEC controller 110, MEC data received from one or more MECs 126, MEC policies received from application analytic engine 140, historical data, and the like. For example, the information stored by analytics storage unit 112 may include the locations of UEs 160 at certain instances in time, an identification of the content copied by MEC controller 110 from a first MEC to a second MEC, a time that the content was copied by MEC controller, and the like. Analytics storage unit 112 may include any one or a combination of volatile or non-volatile local or remote devices suitable for storing information. Analytics storage unit 112 may include random-access memory (RAM), read-only memory (ROM), magnetic storage devices, optical storage devices, or any other suitable information storage device or a combination of these devices. Analytics storage unit 112 may include one or more interfaces and/or processors. Analytics storage unit 112 may be located in any location suitable for communication with other components of system 100. In the illustrated embodiment of FIG. 1, analytics storage unit 112 is located in MEC management environment 114.

MEC management environment 114 of system 100 is a networking environment that manages the interaction between different components of system 100. For example, MEC management environment 114 manages registration requests between application analytic engine 140 and MECs 126, applies MEC policies, synchronizes and migrates content across MECs 126, and maintains the lifecycles of applications on MECs 126. MEC controller 110 of MEC management environment 114 may perform one or more of these actions and analytics storage unit 112 of MEC management environment 114 may store information associated with one or more of these actions. One or more components of MEC management environment 114 may be managed or controlled by an entity (e.g., a service provider). For example, MEC controller 110 and analytics storage unit 112 of MEC management environment 114 may be controlled by the MEC service provider that provides MECs 126.

MEC data engines 120 of system 100 are network components that provide storage and computing resources for MECs 126. In certain embodiments, MEC data engines 120 collect MEC data associated with MECs 126. For example, MEC data engines 120 may collect the following MEC data: service usage patterns (e.g., UE activity), service behavior patterns, UE capabilities (high definition (HD) support, high dynamic range (HDR) support, etc.), device mobility (e.g., mobility zones patterns), UE attachment periods across MECs (i.e., how long a device stays in a particular zone), and the like. MEC data is uniquely available to the MEC service provider associated with MECs 126.

In certain embodiments, MEC data engines 120 segregate MEC data based on an application registration request. For example, the application registration request may include one or more KPIs, and MEC data engines 120 may segregate the MEC data that is responsive to the KPIs (i.e., the KPI values) from the remainder of the MEC data. The KPI values may be specific to a certain application. For example, a first application may be interested in location and time related data, whereas a second application may be interested in mobility related data. In certain embodiments, MEC data engines 120 collapse MEC data based on one or more algorithms. For example, MEC data engines 120 may collapse MEC data using clustering algorithms (e.g., k-means, Density-Based Spatial Clustering of Applications with Noise (DBSCAN), etc.) to filter out redundant MEC data (e.g., replicated data). These clustering algorithms may be used to cluster similar data based on hyperparameters.

As another example, MEC data engines 120 may collapse MEC data using data mining algorithms (e.g., Apriori, FPGrowth, Generalized Sequential Pattern (GSP), Prefix-projected Sequential Pattern Mining (PrefixSpan), etc.). These data mining algorithms may identify patterns during certain time periods and optimize the MEC data based on these patterns. In some embodiments, MEC data engines 120 maintain a data structure to uniquely identify the data requirements of each application. MEC data engines 120 may generate a data stream of MEC data to one or more components of system 100. MEC data engines 120 may generate the data stream based on the segregated MEC data, the collapsed MEC data, or a combination thereof.

MEC hosts 122 of system 100 are micro data centers that store and process content in close proximity to users (e.g., cellular subscribers). MEC hosts 122 store applications in MECs 126. For example, MEC host 122a of MEC 126a may store application A, and MEC host 122b of MEC 126b may store application B. The applications may be associated with an application service provider. The applications may provide services to users (e.g., subscribers) such as video streaming, load balancing, security, retail, social media, telecommunication, gaming, banking, news, and the like. MEC hosts 122 may store applications and/or content for a predetermined period of time. For example, MEC host 122a may store certain application content for hosted application A for a one-hour period at the same time every day in accordance with one or more MEC policies. By locally storing certain applications and/or content on a short term basis in accordance with the MEC policies, MEC hosts 122 can conserve valuable compute and storage resources that may be required for other applications and/or content. MEC hosts 122 provide computing resources, storage capacity, connectivity, and/or access for information received from RANs 170. MEC hosts 122 may include one or more routers, servers, switches, and the like.

UPF nodes 124 of system 100 are network components (e.g., routers, switches, etc.) that support UPF functionality. UPF is a 5G network function that acts as a forwarding engine for user traffic. UPF nodes 124 are responsible for the switching of packets through routers. UPF nodes 124 may provide packet-based routing/forwarding, header manipulations, Quality of Service (QoS), billing/charging, policy controls, and the like.

MECs 126 (e.g., MEC 126a and MEC 126b) of system 100 provide a distributed computing environment for application and service hosting. Each MEC 126 may be defined by an outer perimeter surrounding its physical components. For example, MEC 126a may be defined by an outer perimeter surrounding MEC data engine 120a and MEC host 122a, and MEC 126b may be defined by an outer perimeter surrounding MEC data engine 120b and MEC host 122b. One or more components of MEC 126a and MEC 126b may be connected to each other via a wired connection 128. For example, MEC host 122a of MEC 126a may be hard wired to MEC host 122b of MEC 126b. The outer perimeter of MEC 126a and MEC 126b may be within a predetermined distance of each other. In certain embodiments, the outer perimeters of MEC 126a and MEC 126b are within a maximum distance of each other (e.g., one mile) such that each of MEC 126a and MEC 126b can provide access to the same UE 160.

Application analytic engine 140 of system 100 is a network component that analyzes application data. Application analytic engine 140 may generate application registration requests for applications associated with one or more application service providers. The application service requests may include one or more KPIs. The KPIs include requests for MEC data that the application service provider is interested in. For example, the KPIs may include requests for the following MEC data: the active time of day, the number of UEs 160 attached to MECs 126, real-time user activity, the load on storage and compute in MECs 126, central processing unit (CPU) resources, disk space, the number of instances, location data, neighboring MEC details, and the like. The KPIs may include a request for an interval in which application analytic engine 140 receives MEC data. For example, the KPIs may include a request to receive MEC data associated with a particular application in real-time or in predetermined time intervals (e.g., every second, every minute, hourly, daily, etc.)

In certain embodiments, application analytic engine 140 uses local data associated with an application to generate the KPIs. Local data is data application specific data that is privately available to the application service provider associated with the application. Local data may include an application's capabilities, processing requirements, and the like. In some embodiments, the KPIs are application specific. For example, the local data may indicate that a first application is interested in location and time related data, whereas a second application is interested in mobility related data. This application specific data will provide better usage pattern insight for each application. Accordingly, application analytic engine 140 may generate KPIs associated with location and time related data for the first application and KPIs associated with mobility related data for the second application. Application analytic engine 140 communicates the application registration requests, which include the KPIs, to MEC controller 110 using one or more APIs.

In response to communicating an application registration request to MEC controller 110, application analytic engine 140 may receive an acceptance or a rejection of the application registration request from MEC controller 110. For example, application analytic engine 140 may receive an indication of acceptance of the application registration request, an identification of MEC 126 (e.g., MEC 126a or MEC 126b) that will host the associated application, and an identification of RAN 170 (e.g., RAN 170a or RAN 170b) associated with MEC 126. As another example, application analytic engine 140 may receive an indication of a rejection of the application registration request, a cause for the rejection, and offer details of the nearest MEC 126.

If the application registration request is accepted by MEC controller 110, application analytic engine 140 receives MEC data from MEC controller 110. MEC data is data associated with the application that is uniquely available to the MEC service provider. Application analytic engine 140 combines its local data and the MEC data received from MEC controller 110 to generate MEC policies for the particular application. Application analytic engine 140 may generate the MEC policies by performing analytics on the combined data using statistical methods and/or machine learning techniques. Based on this analysis, application analytic engine 140 requests appropriate storage or compute resources on MEC 126. For example, application analytic engine 140 may predict, based on its analysis, that a certain number of UEs 160 will request to stream videos from a particular video streaming application during a specific time period, and the application analytic engine 140 may request for storage and compute accordingly for the particular video streaming application during that specific certain period. The MEC policies may be associated with one or more of the following: an identification (e.g., a name) of the application, MEC storage requirements, MEC compute requirements, an active time period for hosting the application, a start time for hosting the application, a stop time for hosting the application, a number of instances (e.g., a number of MECs 126) requirement, disk space requirements, and the like.

Application analytic engine 140 may be located in cloud environment 142. Cloud environment 142 of system 100 provides on-demand availability of computer system resources, such as data storage and computing power, without direct active management by the user. In certain embodiments, cloud environment 142 is a data center available to many users over the Internet.

5G core network 150 of system 100 is a network that acts as an anchor point for multi-access technologies. 5G core network 150 may aggregate data traffic from end devices, authenticate subscribers and devices, apply personalized policies, and/or manage the mobility of the devices before routing the traffic to one or more services or the Internet. 5G core network 150 utilizes UPF nodes 124 (e.g., UPF node 124a and UPF node 124b) for traffic routing.

UEs 160 (e.g., UE 160a and UE 160b) of system 100 are devices that are used directly by an end-user to communicate with one or more components of system 100. In the illustrated embodiment of FIG. 1, UEs 160 are mobile devices. UEs 160 may include phones (e.g., smartphones), laptop computers, tablets, personal digital assistants, wearables (e.g., smartwatches, fitness trackers, etc.), and the like. UEs 160 communicate with MECs 126 via RANS 170.

RANs 170 (e.g., RAN 170a and RAN 170b) of system 100 are networks that implement radio access technology. RANs 170 reside between UEs 160 and MECs 126 and provide the connection between UEs 160 and MECs 126. Applications hosted by MECs 126 (e.g., application A and application B) may be exposed to RAN information. In the illustrated embodiment of FIG. 1, RAN 170a provides the connection between UE 160a and UPF node 124a, and RAN 170b provides the connection between UE 160b and UPF node 124b.

In addition to the networks shown in FIG. 1, system 100 may include any type of network that facilitates communication between components of system 100. One or more networks of system 100 may connect one or more components of system 100. This disclosure contemplates any suitable network. One or more portions of any network of system 100 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. One or more networks of system 100 may be a communications network, such as a private network, a public network, a connection through Internet, a mobile network, a Wi-Fi network, a cloud network, etc. One or more components of system 100 may communicate over one or more networks of system 100. One or more networks may include a core network (e.g., a 4G and/or 5G network), an access network, an edge network, an internet service provider (ISP) network, a network service provider (NSP) network, an aggregation network, and the like. One or more networks of system 100 may implement SD-WAN technology. SD-WAN is a specific application of software defined networking technology applied to WAN connections (e.g., broadband Internet, 4G, 5G, Long Term Evolution (LTE), MPLS, etc.).

One or more networks of system 100 include one or more network nodes (e.g., MEC controller 110, MEC data engines 120, application analytic engine 140, and UPF nodes 124). The nodes of system 100 are connection points that can receive, create, store, and/or send data. The nodes of system 100 may be managed by an administrator (e.g., a service provider) of one or more networks. The nodes may include one or more endpoints and/or one or more redistribution points that recognize, process, and forward data to other nodes. In certain embodiments, the nodes of system 100 include data communications equipment such as switches, bridges, modems, hubs, and the like. In some embodiments, the nodes may include data terminal equipment such as routers, servers, printers, workstations, and the like. In certain embodiments, the nodes may include host computers, personal computers, smartphones, Internet of Things (IOT) devices, edge routers, and/or gateways.

In operation, MEC controller 110 receives (see notation 180) an application registration request from application analytic engine 140. The application registration request includes a request for MEC KPIs. MEC controller 110 pushes the application registration request to MEC 126a and receives a response to the application registration request from MEC 126a. MEC controller 110 authenticates and approves the application registration request, generates an application registration request result, and communicates (see notation 182) the application registration request result to application analytic engine 140. The application registration request result includes an indication of acceptance, an identification of MECs 126 that may host the associated application, and an identification of RANs 170 associated with MECs 126. MEC controller 110 receives the requested MEC KPI values from MECs 126 and communicates (see notation 184) the requested MEC KPI values to application analytic engine 140 in time intervals requested by application analytic engine 140. Application analytic engine 140 generates MEC policies based on the MEC KPI values and local data and communicates (see notation 186) the MEC policies to MEC controller 110. MEC controller 110 determines to host the application in MEC 126b based on the MEC policies and, in response to this determination, transfers (see notation 188) the application to MEC 126b for hosting. As such, system 100 optimizes storage and compute resources at MECs 126 based on the insights derived from the MEC service provider and the application service provider.

Although FIG. 1 illustrates a particular arrangement of MEC controller 110, analytics storage unit 112, MEC data engines 120, MEC hosts 122, UPF nodes 124, MECs 126, application analytic engine 140, 5G core network 150, UEs 160, and RANs 170, this disclosure contemplates any suitable arrangement of MEC controller 110, analytics storage unit 112, MEC data engines 120, MEC hosts 122, UPF nodes 124, MECs 126, application analytic engine 140, 5G core network 150, UEs 160, and RANs 170.

Although FIG. 1 illustrates a particular number of MEC controllers 110, analytics storage units 112, MEC data engines 120, MEC hosts 122, UPF nodes 124, MECs 126, application analytic engines 140, 5G core networks 150, UEs 160, and RANs 170, this disclosure contemplates any suitable number of MEC controllers 110, analytics storage units 112, MEC data engines 120, MEC hosts 122, UPF nodes 124, MECs 126, application analytic engines 140, 5G core networks 150, UEs 160, and RANs 170. For example, system 100 may include more than two MECs 126.

FIG. 2 illustrates an example flow diagram 200 for managing MEC application hosting. Flow diagram 200 or portions thereof may be associated with an entity, which may include any entity, such as a business or company (e.g., an MEC service provider) that manages MEC application hosting. The components of flow diagram 200 may include any suitable combination of hardware, firmware, and software. For example, the components of flow diagram 200 may use one or more elements of the computer system of FIG. 4. Flow diagram 200 includes MEC controller 110, MEC 126a, MEC 126b, application analytic engine 140, and UE 160a.

As illustrated in flow diagram 200 of FIG. 2, application analytic engine 140 communicates a registration message to MEC controller 110. MEC controller 110 is managed by an MEC service provider. The registration message includes an application registration request for an MEC to host an application. The application registration request includes KPIs associated with a particular application. MEC controller 110 pushes the registration message to MEC 126a. MEC 126a then pushes the registration message to MEC 126b.

MEC 126b responds to the registration message by communicating a return success message to MEC 126a. MEC 126a communicates a return success message to MEC controller 110. MEC controller 110 then communicates the return success message to application analytic engine 140. The return success message indicates to application analytic engine 140 that the MEC service provider associated with MEC controller 110 can host the application.

MEC 126a and MEC 126b generate MEC data in response to the application registration request. The MEC data is associated with the particular application. MEC 126a and MEC 126b cluster the MEC data using analytic pattern learning to generate clustered MEC data. For example, MEC 126 and MEC 126b may cluster the MEC data using clustering algorithms to filter out redundant MEC data (e.g., replicated data). MEC 126a and MEC 126b may then collapse the clustered MEC data to generate clustered, collapsed MEC data. For example, MEC 126a and MEC 126b may collapse the MEC data using machine learning algorithms that identify patterns during certain time periods and optimize the MEC data based on these patterns. The clustered, collapsed MEC data may include one or more of the requested KPI values. MEC 126a and/or MEC 126b may then communicate the clustered, collapsed MEC data to MEC controller 110. MEC controller 110 communicates the clustered, collapsed MEC data to application analytic engine 140.

Application analytic engine 140 uses the clustered, collapsed MEC data to generate MEC policies. The MEC policies may include MEC storage requirements, MEC compute requirements, a start time for hosting the application, a stop time for hosting the application, and the like. Application analytic engine 140 communicates the MEC policies to MEC controller 110. MEC controller 110 determines, based on the MEC policies, to host the application in MEC 126b and communicates the MEC polices to MEC 126b. MEC 126b accepts the MEC policies and communicates an MEC redirect address to MEC controller 110, which pushes the MEC redirect address to application analytic engine 140. The MEC redirect address may include a Uniform Resource Locator (URL) and/or an Internet Protocol (IP) address of MEC 126*b*. UE 160*a*, which is in within the zone of MEC 126*a*, communicates a UE redirect address of UE 160*a* to MEC controller 110, which pushes the UE redirect address to application analytic engine 140. The UE redirect address may include a URL and/or an IP address of UE 160*a*. Application analytic engine 140 communicates a data request from the application to UE 160*a*. UA 160*a* receives the data request and begins streaming content from the application hosted in MEC 126*a*. As such, flow diagram 200 optimizes storage and compute resources at MECs 126 based on the insights derived from MECs 126 and application analytic engine 140.

Although flow diagram 200 of FIG. 2 illustrates a particular arrangement of MEC controller 110, MEC 126*a*, MEC 126*b*, application analytic engine 140, and UE 160*a*, this disclosure contemplates any suitable arrangement of MEC controller 110, MEC 126*a*, MEC 126*b*, application analytic engine 140, and UE 160*a*. For example, in certain embodiments, UE 160*a* may be replaced with UE 160*b*. As another example, in some embodiments, MEC 126*a* and MEC 126*b* may be switched. Although flow diagram 200 of FIG. 2 illustrates a particular number of MEC controllers 110, MECs 126*a*, MECs 126*b*, application analytic engine 140*s*, and UEs 160*a*, this disclosure contemplates any suitable number of MEC controllers 110, MECs 126*a*, MECs 126*b*, application analytic engine 140*s*, and UEs 160*a*. For example, flow diagram 200 may include more than two MECs.

FIG. 3 illustrates an example method 300 for managing MEC application hosting. Method 300 begins at step 305. At step 310, an MEC controller (e.g., MEC controller 110 of FIG. 1) receives an application registration request from an application analytic engine (e.g., application analytic engine 140 of FIG. 1). The application registration request is a request from an application service provider to host an application in an MEC (e.g., MECs 126 of FIG. 1). The application registration request includes a request for MEC KPIs. MEC controller 110 communicates the application registration request to a first MEC (e.g., 126*a*). Method 300 then moves from step 310 to step 315.

At step 315, the MEC controller determines whether the application registration request is approved. For example, the MEC controller may determine that the application registration request is approved if the MEC controller receives a reply (e.g., a return success message) from the first MEC in response to sending the first MEC the application registration request. As another example, the MEC controller may determine that the application registration request is not approved if the MEC controller does not receive a reply from the first MEC in response to sending the first MEC the application registration request.

If the MEC controller determines that the application registration request is not approved, method 300 moves from step 315 to step 320, where the MEC controller communicates a rejection response to the application analytic engine. For example, if the MEC controller does not receive a reply message from the first MEC in response to sending the first MEC the application registration request, the MEC controller may communicate a rejection response (e.g., an error code) to the application analytic engine. Method 300 then moves from step 320 to step 355, where method 300 ends.

If, at step 315, the MEC controller determines that the application registration request is approved, method 300 moves from step 315 to step 325, where the MEC controller communicates an approval response to the application analytic engine. For example, if the MEC controller authenticates the application registration request and receives a reply message from the first MEC in response to sending the first MEC the application registration request, the MEC controller may communicate an approval response (e.g., a success result) to the application analytic engine. Method 300 then moves from step 325 to step 330.

At step 330 of method 300, the MEC controller receives MEC data from the first MEC. The MEC data includes MEC KPIs associated with the first MEC and a second MEC. Method 300 then moves from step 330 to step 335, where the MEC controller communicates the MEC data to the application analytic engine. The application analytic engine uses the MEC data, along with its local data, to generate MEC policies. The MEC policies may include MEC storage requirements, MEC compute requirements, a start time for hosting the application, a stop time for hosting the application, and the like. Method 300 then moves from step 335 to step 340.

At step 340 of method 300, the MEC controller receives the MEC policies from the application analytic engine. Method 300 then moves from step 340 to step 345, where the MEC controller orchestrates content and application hosting based on the MEC policies. For example, the MEC controller may determine to host the application in the first MEC if the first MEC can satisfy the MEC policies. As another example, the MEC controller may determine to host the application in the second MEC if the first MEC cannot satisfy the MEC policies but the second MEC can. As still another example, the MEC controller may determine to share the hosting of the application between the first and second MECs by hosting a certain percentage of the application content at the first MEC and the remainder of the application content at the second MEC. Method 300 then moves from step 350 to step 355, where method 300 ends.

Although this disclosure describes and illustrates an example method 300 for managing MEC application hosting including the particular steps of the method of FIG. 3, this disclosure contemplates any suitable method 300 for managing MEC application hosting, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a Wi-Fi network, a Wi-MAX network, a cellular telephone network (such as, for example, a Global System for Mobile Communications (GSM) network, a 3G/Universal Mobile Telecommunications Service (UMTS) network, a LTE network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A device, comprising:
one or more processors; and
one or more computer-readable non-transitory storage media coupled to the one or more processors and comprising instructions that, when executed by the one or more processors, cause the device to perform operations comprising:
communicating mobile edge computing (MEC) data associated with a first MEC host and a second MEC host to an application analytic engine;
receiving MEC policies from the application analytic engine;
determining to host a first application in the first MEC host based on the MEC policies;
communicating the MEC policies to the first MEC host;
determining that a user equipment (UE) is streaming content from the first application hosted in the first MEC host;
determining that the UE is moving to a third MEC host;
copying the content to a second application hosted in the third MEC host; and
redirecting the UE to stream the content from the second application hosted in the third MEC host.

2. The device of claim 1, wherein:
the MEC data is collected by a first MEC data engine located within the first MEC host and by a second MEC data engine located within the second MEC host; and
the MEC data is associated with one or more of the following:
service usage patterns;
UE capabilities;
device mobility; and
a UE attachment period across the first and second MEC hosts.

3. The device of claim 1, wherein:
the MEC data is associated with an MEC service provider;
the application analytic engine is associated with an application service provider; and
the MEC policies are generated by the application analytic engine using the MEC data associated with the MEC service provider and application data associated with the application service provider.

4. The device of claim 1, wherein the MEC policies are associated with one or more of the following:
MEC storage requirements;
MEC compute requirements;
a start time for hosting the first application; and
a stop time for hosting the first application.

5. The device of claim 1, wherein the third MEC host is located greater than a predetermined distance from the first MEC host.

6. The device of claim 1, the operations further comprising:
receiving a registration request for the first application from the application analytic engine;
generating a registration request result in response to authenticating and approving the registration request; and
communicating the registration request result to the application analytic engine.

7. The device of claim 1, wherein:
a physical component of the first MEC host and a physical component of the second MEC host are connected to each other via a wired connection; and
the physical component of the first MEC host and the physical component of the second MEC host are located within a mile of each other.

8. A method, comprising:
communicating mobile edge computing (MEC) data associated with a first MEC host and a second MEC host to an application analytic engine;
receiving MEC policies from the application analytic engine;
determining to host a first application in the first MEC host based on the MEC policies;
communicating the MEC policies to the first MEC host;
determining that a user equipment (UE) is streaming content from the first application hosted in the first MEC host;
determining that the UE is moving to a third MEC host;
copying the content to a second application hosted in the third MEC host; and
redirecting the UE to stream the content from the second application hosted in the third MEC host.

9. The method of claim 8, wherein:
the MEC data is collected by a first MEC data engine located within the first MEC host and by a second MEC data engine located within the second MEC host; and
the MEC data is associated with one or more of the following:
service usage patterns;
UE capabilities;
device mobility; and
a UE attachment period across the first and second MEC hosts.

10. The method of claim 8, wherein:
the MEC data is associated with an MEC service provider;
the application analytic engine is associated with an application service provider; and
the MEC policies are generated by the application analytic engine using the MEC data associated with the MEC service provider and application data associated with the application service provider.

11. The method of claim 8, wherein the MEC policies are associated with one or more of the following:
MEC storage requirements;
MEC compute requirements;
a start time for hosting the first application; and
a stop time for hosting the first application.

12. The method of claim 8, wherein the third MEC host is located greater than a predetermined distance from the first MEC host.

13. The method of claim 8, further comprising:
receiving a registration request for the first application from the application analytic engine;

generating a registration request result in response to authenticating and approving the registration request; and communicating the registration request result to the application analytic engine.

14. The method of claim 8, wherein:
a physical component of the first MEC host and a physical component of the second MEC host are connected to each other via a wired connection; and
the physical component of the first MEC host and the physical component of the second MEC host are located within a mile of each other.

15. One or more computer-readable non-transitory storage media embodying instructions that, when executed by a processor, cause the processor to perform operations comprising:
communicating mobile edge computing (MEC) data associated with a first MEC host and a second MEC host to an application analytic engine;
receiving MEC policies from the application analytic engine;
determining to host a first application in the first MEC host based on the MEC policies;
communicating the MEC policies to the first MEC host;
determining that a user equipment (UE) is streaming content from the first application hosted in the first MEC host;
determining that the UE is moving to a third MEC host;
copying the content to a second application hosted in the third MEC host; and
redirecting the UE to stream the content from the second application hosted in the third MEC host.

16. The one or more computer-readable non-transitory storage media of claim 15, wherein:
the MEC data is collected by a first MEC data engine located within the first MEC host and by a second MEC data engine located within the second MEC host; and
the MEC data is associated with one or more of the following:
service usage patterns;
UE capabilities;
device mobility; and
a UE attachment period across the first and second MEC hosts.

17. The one or more computer-readable non-transitory storage media of claim 15, wherein:
the MEC data is associated with an MEC service provider;
the application analytic engine is associated with an application service provider; and
the MEC policies are generated by the application analytic engine using the MEC data associated with the MEC service provider and application data associated with the application service provider.

18. The one or more computer-readable non-transitory storage media of claim 15, wherein the MEC policies are associated with one or more of the following:
MEC storage requirements;
MEC compute requirements;
a start time for hosting the first application; and
a stop time for hosting the first application.

19. The one or more computer-readable non-transitory storage media of claim 15, wherein the third MEC host is located greater than a predetermined distance from the first MEC host.

20. The one or more computer-readable non-transitory storage media of claim 15, the operations further comprising:
receiving a registration request for the first application from the application analytic engine;
generating a registration request result in response to authenticating and approving the registration request; and
communicating the registration request result to the application analytic engine.

* * * * *